United States Patent [19]
Nakamura et al.

[11] Patent Number: 6,060,887
[45] Date of Patent: May 9, 2000

[54] METHOD OF DETECTING ABNORMALITY IN MAGNETIC HEAD, CIRCUIT THEREFOR, AND MAGNETIC DISK APPARATUS

[75] Inventors: Norio Nakamura, Yokohama; Nobuyasu Goto, Fuchu, both of Japan

[73] Assignee: Kabushiki Kaisha Toshiba, Kawasaki, Japan

[21] Appl. No.: 08/892,992

[22] Filed: Jul. 15, 1997

[30] Foreign Application Priority Data

Jul. 16, 1996 [JP] Japan .................................... 8-186315

[51] Int. Cl.[7] ............................................ G01R 31/06
[52] U.S. Cl. ............................................ 324/546; 324/213
[58] Field of Search .................................. 324/210, 213, 324/546, 537, 522

[56] References Cited

U.S. PATENT DOCUMENTS

5,589,777  12/1996  Davis ...................................... 324/537
5,696,445  12/1997  Inbar ...................................... 324/228
5,721,488   2/1998  Sakai ...................................... 324/210

*Primary Examiner*—Josie Ballato
*Assistant Examiner*—Russell M. Kobert
*Attorney, Agent, or Firm*—Oblon, Spivak, McClelland, Maier & Neustadt, P.C.

[57] ABSTRACT

A circuit and method for detecting an abnormality in a recording head, wherein a voltage detection circuit detects a counter electromotive voltage generated across the two terminals of a recording head to which a recording current is supplied from a recording circuit; a processing circuit generates the maximum, minimum, and mean voltages from the counter electromotive voltage; a discrimination circuit using these voltages determines whether an abnormality occurs in the recording head. An output circuit outputs the result. With this operation, an abnormality in the recording head having two terminals in an MR head can be detected with a high precision.

14 Claims, 9 Drawing Sheets

METHOD OF DETECTING ABNORMALITY IN MAGNETIC HEAD, CIRCUIT THEREFOR, AND MAGNETIC DISK APPARATUS

BACKGROUND OF THE INVENTION

The present invention relates to a method of detecting an abnormality in a magnetic head, a circuit therefor, and a magnetic disk apparatus including an abnormality detection circuit.

A magnetic disk apparatus generally has additional functions of detecting operation abnormalities in respective parts inside the apparatus. One function is to detect an abnormality in a magnetic head for recording and reproducing data. The magnetic head is generally connected to a recording/reproduction integrated circuit through a plurality of thin wires. When such a wire is disconnected or short-circuited, occurrence of an abnormality in the magnetic head is detected.

An abnormality in the magnetic head is detected by monitoring a counter electromotive force generated across the two terminals of a recording coil in recording. More specifically, if the wire of the magnetic head is disconnected or short-circuited, detection is made not to generate the counter electromotive force across the two terminals of the recording coil. The detected record is stored in the recording/reproduction integrated circuit connected to the magnetic head in many cases.

Figure 1:
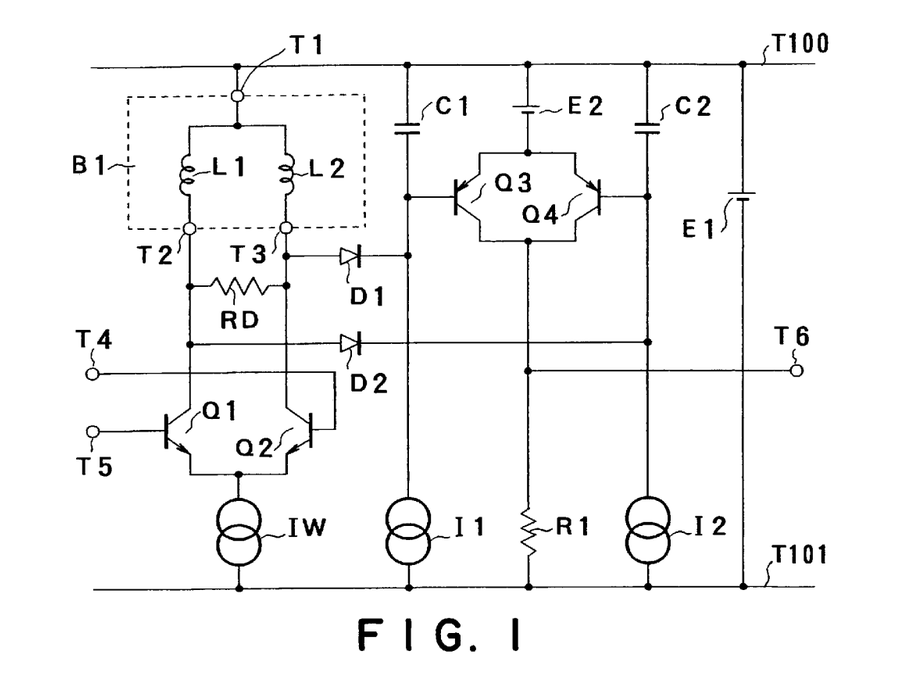
FIG. 1 is a circuit diagram showing the configuration of a magnetic head abnormality detection circuit associated with the present invention.
Figure 2:
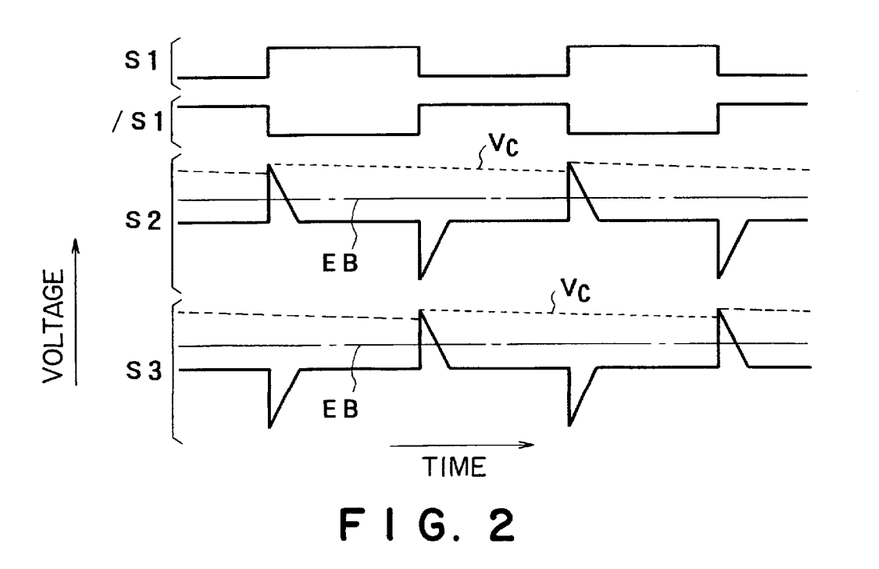
FIG. 2 is a timing chart showing the waveforms of respective voltages in the abnormality detection circuit.

FIG. 1 shows the configuration of a recording/reproduction integrated circuit connected to a magnetic head, and a circuit for detecting a recording abnormality, which are associated with the present invention. FIG. 2 shows the waveforms of respective signals used in this circuit. In FIG. 1, a constant-voltage power supply E1 of this circuit is connected between terminals T100 and T101. A magnetic head B1 has coils L1 and L2. One terminal of each of the coils L1 and L2 has a corresponding one of terminals T2 and T3. A terminal T1 connected to the terminal T100 is arranged at the connection node between the coils L1 and L2. The coils L1 and L2 are coupled with a coupling coefficient of 1.

A resistor RD connected between the terminals T2 and T3 is equivalent to a damping resistor for shaping the waveform of a recording current flowing through the coils L1 and L2 into a desired waveform.

A transistor Q1 having the collector and emitter connected between the terminal T2 and one terminal of a constant current source IW, and a transistor Q2 having the collector and emitter connected between the terminal T3 and one terminal of the constant current source IW correspond to driving transistors which receive the recording current through terminals T5 and T4 connected to their bases.

The terminals T2 and T3 are connected to the anodes of diodes D1 and D2 for detecting counter electromotive voltages generated on the positive sides of the terminals T2 and T3. A capacitor C1 and a constant current source I1 are series-connected between the terminals T100 and T101, while a capacitor C2 and a constant current source I2 are series-connected parallel thereto. One terminal of a biasing DC voltage source E2 is connected to the terminal T100, and the other terminal is connected to the emitters of transistors Q3 and Q4. A resistor R1 is connected between the collectors of the transistors Q3 and Q4 and the terminal T100. The bases of the transistors Q3 and Q4 are respectively connected to the anodes of the diodes D1 and D2, and correspond to transistors for detecting the counter electromotive voltages input through the diodes D1 and D2.

The constant current sources I1 and I2 correspond to current sources for removing accumulated electric charges in the capacitors C1 and C2, and the resistor R1 is a load resistor for the transistors Q3 and Q4. The connection node between the collectors of the transistors Q3 and Q4 and the resistor R1 is connected to a connection terminal T6.

The operation of the magnetic head abnormality detection circuit having this arrangement will be described.

When signals S1 and /S1 having complementary waveforms like the ones shown in FIG. 2 are respectively input to the terminals T4 and T5, a current from the constant current source IW alternately flows through the coils L1 and L2 of the magnetic head B1. At this time, voltages having counter electromotive voltage waveforms, shown as signals S2 and S3 in FIG. 2, are respectively generated at the terminals T2 and T3 of the magnetic head B1.

The diodes D1 and D2 extract the positive-side waveforms of the counter electromotive voltage waveforms of the signals S2 and S3, and supply them to the bases of the transistors Q3 and Q4. The bases of the transistors Q3 and Q4 are respectively connected to hold circuits each constituted by the capacitor C1 and the constant current source I1, or the capacitor C2 and the constant current source I2. With this arrangement, the peak voltages of the respective positive-side waveforms are held.

In FIG. 2, peak voltages VC of the signals S2 and S3 are indicated by broken lines, and held by the capacitors C1 and C2. While the counter electromotive voltage is generated across the terminals T2 and T3, i.e., the magnetic head B1 operates normally, the peak voltages VC are held by the capacitors C1 and C2, and the transistors Q3 and Q4 receiving the voltages VC through their bases are in an inoperative state. As a result, the potential of the resistor R1 connected to the collectors of the transistors Q3 and Q4 is held at a constant level.

If an abnormality occurs in the magnetic head B1, no counter electromotive voltage is generated across the terminals T2 and T3, the potentials of the capacitors C1 and C2 decrease due to the constant current sources I1 and I2, and the base potentials of the transistors Q3 and Q4 decrease. If the maximum voltage at the terminal T1 of the magnetic head B1 becomes lower than a potential EB, shown in FIG. 2, set at the voltage source E2, the transistors Q3 and Q4 are set in an operative state. Accordingly, the voltage of the resistor R1 rises to raise the level at the terminal T6. In this manner, when an abnormality occurs in the magnetic head, the abnormality is detected on the basis of the voltage generated at the terminal T6.

Most of magnetic heads used in magnetic disk apparatuses have been induction heads for both recording and reproduction. In recent years, however, the reproduction ability of the induction head is being limited, and the magnetic head is shifting to a magnetic head (to be referred to as an MR head hereinafter) using a magnetoresistive effect element for a reproduction head. This MR head is a combined head constituted by the induction head for recording and the magnetoresistive effect element (to be referred to as an MR element hereinafter) for reproduction. Therefore, the induction head and the MR head have no difference in terms of the recording ability. However, the data transfer rate is as high as, e.g., 100 Mbit/sec in proportion to the reproduction ability of the MR head, and the inductance is being decreased by decreasing the number of turns of the coil of the recording head in order to improve the leading characteristics of the recording current.

For example, the coil of a thin-film head as a kind of induction head has 40 to 50 turns. To the contrary, the coil of the recording head of the MR head has about 16 turns. Since the inductance of the coil is proportional to the square of the number of turns of the coil, it is obtained from the number of turns in the MR head. The inductance of the coil is proportional to the square of the number of turns of the coil, so that the inductance of the MR head is about 0.2 µH.

In this manner, the magnetic head shifts from the induction head to the highly sensitive MR head, and the recording density increases to increase the data transfer rate. As a result, the inductance of the wire connecting the magnetic head and the recording/reproduction integrated circuit, and the presence of a stray capacitance cannot be ignored. Demand arises for highly precise detection of an abnormality in the magnetic head.

In most of recent magnetic heads, the recording coil is constituted by two terminals, so that the recording circuit and the magnetic head abnormality detection circuit are also indispensably improved.

SUMMARY OF THE INVENTION

It is, therefore, an object of the present invention to provide a magnetic head abnormality detection method and circuit capable of precisely detecting an abnormality in a magnetic head, and a magnetic disk apparatus.

The waveform of a counter electromotive voltage generated across the two terminals of the magnetic head in normal recording differs from that in the abnormal state of the magnetic head. In the present invention, the abnormality is detected using this waveform difference of the voltage generated across the two terminals of the magnetic head.

According to the present invention, there is provided a method of detecting an abnormality in a magnetic head, comprising the steps of causing voltage detection means to detect a maximum voltage, a minimum voltage, and a mean voltage generated across two terminals of the magnetic head supplied with a recording current from recording means, causing processing means using the detected maximum, minimum, and mean voltages to calculate either of an absolute value of a first voltage difference between the mean voltage and the maximum voltage, or a total of the absolute value of the first voltage difference and a predetermined value, and an absolute value of a second voltage difference between the mean voltage and the minimum voltage, and causing discrimination means to compare either of the calculated absolute value of the first voltage difference or the calculated total of the absolute value of the first voltage difference and the predetermined value with the calculated absolute value of the second voltage difference, and discriminate whether an abnormality occurs in the magnetic head.

In order to relax the influence of noise, the step of causing the discrimination means to discriminate whether the abnormality occurs in the magnetic head desirably comprises discriminating that the abnormality occurs in the magnetic head when the absolute value of the second voltage difference is smaller than the total of the absolute value of the first voltage difference and the predetermined value.

According to the present invention, there is provided a circuit of detecting an abnormality in a magnetic head, comprising recording means, connected to a terminal of the magnetic head, for supplying a recording current to the magnetic head, voltage detection means, connected to the terminal of the magnetic head, for receiving the recording current from the recording means, and detecting a maximum voltage, a minimum voltage, and a mean voltage generated across two terminals of the magnetic head, processing means for receiving the maximum, minimum, and mean voltages detected by the voltage detection means, and calculating one of an absolute value of a first voltage difference between the mean voltage and the maximum voltage, and a total of the absolute value of the first voltage difference and a predetermined value, and an absolute value of a second voltage difference between the mean voltage and the minimum voltage, and discrimination means for receiving and comparing one of the absolute value of the first voltage difference and the total of the absolute value of the first voltage difference and the predetermined value, with the absolute value of the second voltage difference, which are calculated by the processing means, and discriminating whether an abnormality occurs in the magnetic head.

The voltage detection means may comprise a first current source connected between a power supply voltage terminal and a first output terminal, a first diode element having an anode connected to the first output terminal, and a cathode connected to a first input terminal, a first resistor element having two terminals connected between the first input terminal and a second output terminal, a second resistor element having two terminals connected between the second output terminal and a second input terminal, a second diode element having an anode connected to the second input terminal, and a cathode connected to a third output terminal, a second current source having two terminals connected between the third output terminal and a ground terminal, a third diode element having an anode connected to the first output terminal, and a cathode connected to the second input terminal, a first capacitor having two terminals connected between the first output terminal and the ground terminal, a fourth diode element having an anode connected to the first input terminal, and a cathode connected to the third output terminal, a second capacitor having two terminals connected between the third output terminal and the ground terminal, and a third capacitor having two terminals connected between the second output terminal and the ground terminal, and, when the first input terminal receives a counter electromotive voltage generated across the two terminals of the magnetic head to which the recording current is supplied, and the second input terminal receives an inverted counter electromotive voltage having a phase shifted by 180° from that of the counter electromotive voltage, the minimum voltage is output from the first output terminal, the mean voltage is output from the second output terminal, and the maximum voltage is output from the third output terminal.

The processing means may comprise a first transistor having a collector connected to a power supply voltage terminal, a base connected to a first input terminal, and an emitter connected to the other terminal of a first current source with one terminal grounded, a second transistor having an emitter connected to the power supply voltage terminal, a base connected to a first node, and a collector connected to a second node, first and second resistor elements series-connected between the second node and the other terminal of the first current source, a third transistor having an emitter connected to the power supply voltage terminal directly or through a third resistor element, and a base connected to a collector thereof, a fourth transistor having an emitter connected to the power supply voltage terminal directly or through a fourth resistor element, a base connected to the base of the third transistor, and a collector connected to the first node, a capacitor having two terminals connected between the first and second nodes, a fifth transistor having a collector connected to the collector of the third transistor, a base connected to a connection node between the first and second resistor elements, and an emitter connected to the other terminal of a second current source with one terminal grounded, a sixth transistor having a collector connected to the first node, a base connected to a second input terminal, and an emitter connected to the other terminal of the second current source, and a seventh transistor having an emitter connected directly or through a fifth resistor element to the other terminal of a third current source with one terminal grounded, a base connected to a third input terminal, and a grounded collector, and, when the minimum voltage is input to the first input terminal, the mean voltage is input to the second input terminal, and the maximum voltage is input to the third input terminal, the absolute value of the second voltage difference is output from the second node, and the absolute value of the first voltage difference is output from a connection node between the other terminal of the third current source and the collector of the seventh transistor, or the total of the absolute value of the first voltage difference and the predetermined value is output from a connection node between the other terminal of the third current source and the fifth resistor element.

The discrimination means may comprise a first transistor having an emitter connected to a power supply voltage terminal directly or through a first resistor element, and a base connected to a collector thereof, a second transistor having an emitter connected to the power supply voltage terminal directly or through a second resistor element, and a base connected to the base of the first transistor, a third transistor having a collector connected to the collector of the first transistor, the collector being connected to the other terminal of a first current source with one terminal grounded, and a fourth transistor having a collector connected to the collector of the second transistor, the collector being connected to the other terminal of the first current source with one terminal grounded, and, when the absolute value of the second voltage difference is input to a base of the third transistor, and one of the absolute value of the first voltage difference and the total of the absolute value of the first voltage difference and the predetermined value is input to a base of the fourth transistor, a signal representing presence/absence of an abnormality in the magnetic head is output from the collector of the second transistor.

According to the present invention, there is provided a magnetic disk apparatus comprising a magnetic head for performing recording on a magnetic disk, recording means, connected to a terminal of the magnetic head, for supplying a recording current to the magnetic head, voltage detection means, connected to the terminal of the magnetic head, for receiving the recording current from the recording means, and detecting a maximum voltage, a minimum voltage, and a mean voltage generated across two terminals of the magnetic head, processing means for receiving the maximum, minimum, and mean voltages detected by the voltage detection means, and calculating one of an absolute value of a first voltage difference between the mean voltage and the maximum voltage, and a total of the absolute value of the first voltage difference and a predetermined value, and an absolute value of a second voltage difference between the mean voltage and the minimum voltage, and discrimination means for receiving and comparing one of the absolute value of the first voltage difference and the total of the absolute value of the first voltage difference and the predetermined value, with the absolute value of the second voltage difference, which are calculated by the processing means, and discriminating whether an abnormality occurs in the magnetic head.

According to the present invention, an abnormality in the magnetic disk can be detected using characteristics that the absolute value of the voltage difference between the mean and minimum voltages is larger than that of the voltage difference between the mean and maximum voltages in the waveform of the counter electromotive voltage generated across the two terminals of the normal magnetic head in recording. Therefore, an abnormality can be precisely detected, and the reliability of the magnetic disk apparatus can be improved.

DESCRIPTION OF THE PREFERRED EMBODIMENT

A magnetic head abnormality detection method and circuit, and a magnetic disk apparatus according to an embodiment of the present invention will be described below.

In this embodiment, an abnormality in a magnetic head is detected on the basis of the following principle. The waveform of a voltage generated across the two terminals of the magnetic head in normal recording is different from that upon occurrence of disconnection or a short circuit. More specifically, the maximum, minimum, and mean voltages are generated across the two terminals of the magnetic head. The magnitude relationship between the absolute value of the potential difference between the mean and maximum voltages, and the absolute value of the potential difference between the mean and minimum voltages in normal state differs from that in the abnormal state. This difference is constantly observed during recording of the magnetic head to detect an abnormality.

Figure 3:
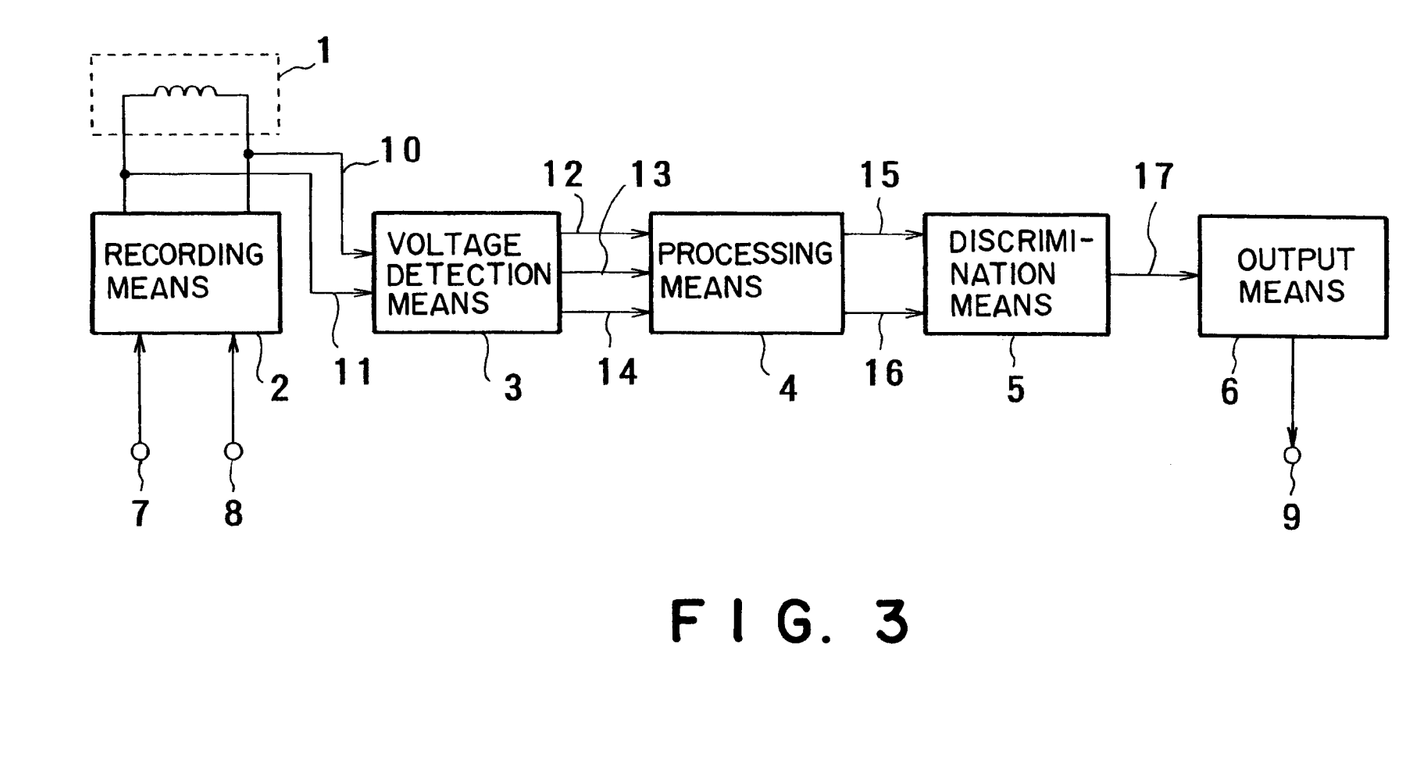
FIG. 3 is a block diagram showing the arrangement of a magnetic disk apparatus including a magnetic head abnormality detection circuit according to an embodiment of the present invention.
Figure 9:
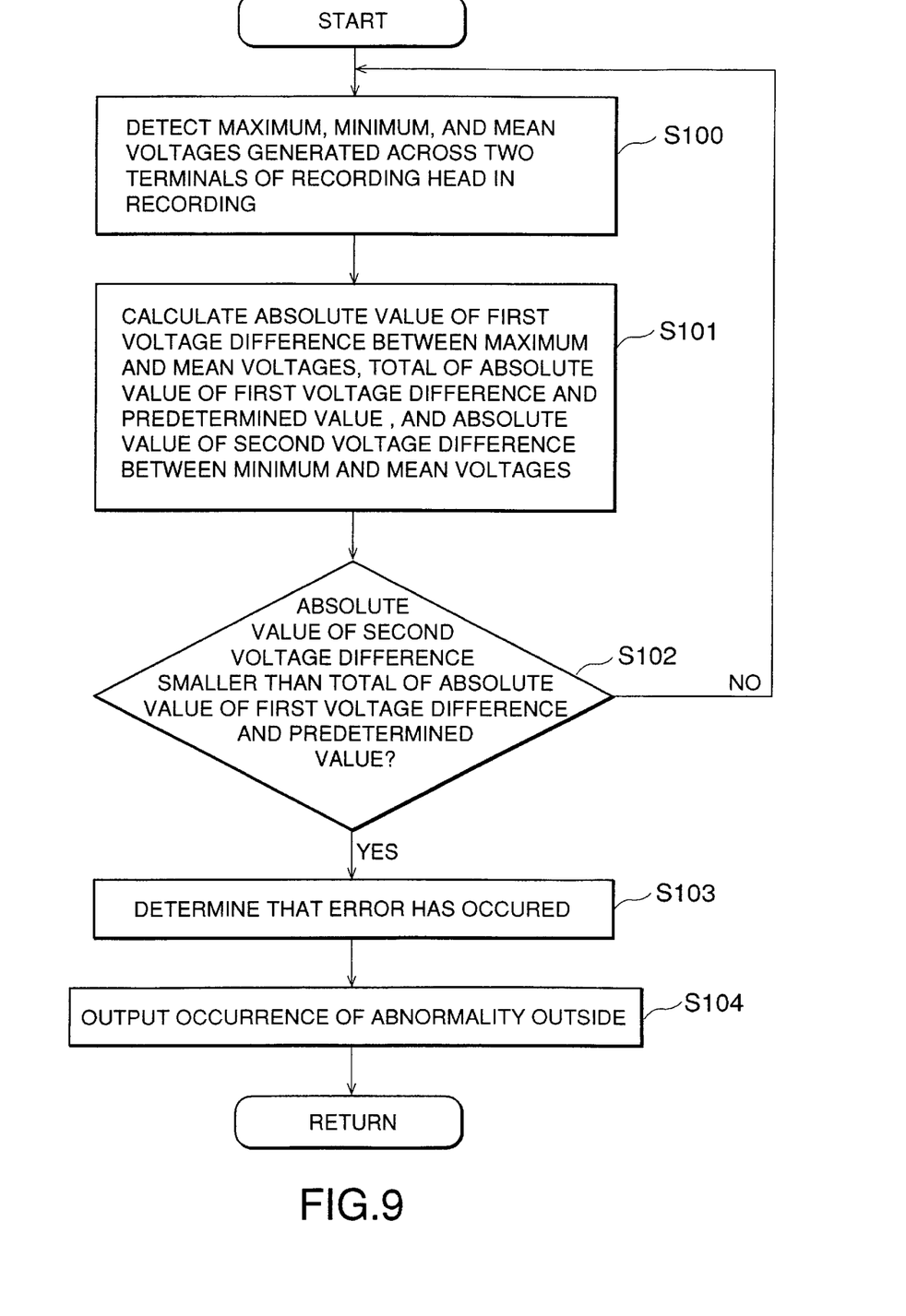
FIG. 9 is a flow chart showing the processing procedure of a magnetic head abnormality detection method according to an embodiment of the present invention.

This embodiment will be described in detail below with reference to the accompanying drawings. FIG. 3 shows the arrangement of the magnetic head abnormality detection circuit of this embodiment and the magnetic disk apparatus including this circuit and the magnetic head. FIG. 9 shows a processing procedure of the magnetic head abnormality detection method according to this embodiment.

A magnetic head 1 of recording and reproduction heads included in an MR head corresponds to the recording head, and is constituted by two terminals. A recording means 2 supplies a recording current to the magnetic head 1. The direction of the recording current flowing through the magnetic head 1 is changed in accordance with the presence/absence of information recorded on a magnetic disk (not shown). The recording information is externally input to input terminals 7 and 8 of the recording means 2.

Signal lines 10 and 11 are connected to the two terminals of the magnetic head 1 to extract a voltage generated across the two terminals of the magnetic head 1. When disconnection, a short circuit, or the like occurs in the magnetic head 1, the extracted voltage has a waveform different from that in the normal state. In this embodiment, an abnormality in the magnetic head 1 is detected on the basis of the difference in the waveforms of voltages extracted through the signal lines 10 and 11, as described above.

A voltage detection means 3 is connected to the signal lines 10 and 11. As shown in step S100 of FIG. 9, the voltage detection means 3 detects the maximum, mean, and minimum voltages from the voltage generated across the two terminals of the magnetic head 1, and outputs them to signal lines 12, 13, and 14, respectively.

A processing means 4 calculates, in step S101, the first absolute value of the voltage difference between the maximum and mean voltages, and the second absolute value of the voltage difference between the minimum and mean voltages on the basis of the maximum, mean, and minimum voltages output from the signal lines 12, 13, and 14. The processing means 4 outputs the total of the first absolute value and a predetermined value, and the second absolute value to signal lines 15 and 16, respectively.

A discrimination means 5 compares the total of the absolute value of the first voltage difference and the predetermined value, and the second absolute value which are supplied through the signal lines 15 and 16, thereby discriminating the presence/absence of an abnormality in the magnetic head 1. When the second absolute value is not smaller than the total of the absolute value of the first voltage difference and the predetermined value, the discrimination means 5 determines that the magnetic head 1 is normal, and repeatedly performs the abnormality detection operation of the magnetic head 1 during recording, as shown in steps S100 to S102. When the second absolute value is smaller than the total of the absolute value of the first voltage difference and the predetermined value, the discrimination means 5 determines in step S103 that an abnormality has occurred in the magnetic head 1, and outputs the discrimination result to a signal line 17.

In step S104, an output means 6 outputs, as a binary signal, the discrimination result supplied through the signal line 17 to the outside through an output terminal 9.

Examples of the detailed circuit configurations of the recording means 2, the voltage detection means 3, the processing means 4, the discrimination means 5, and the output means 6 will be described below.

Figure 4:
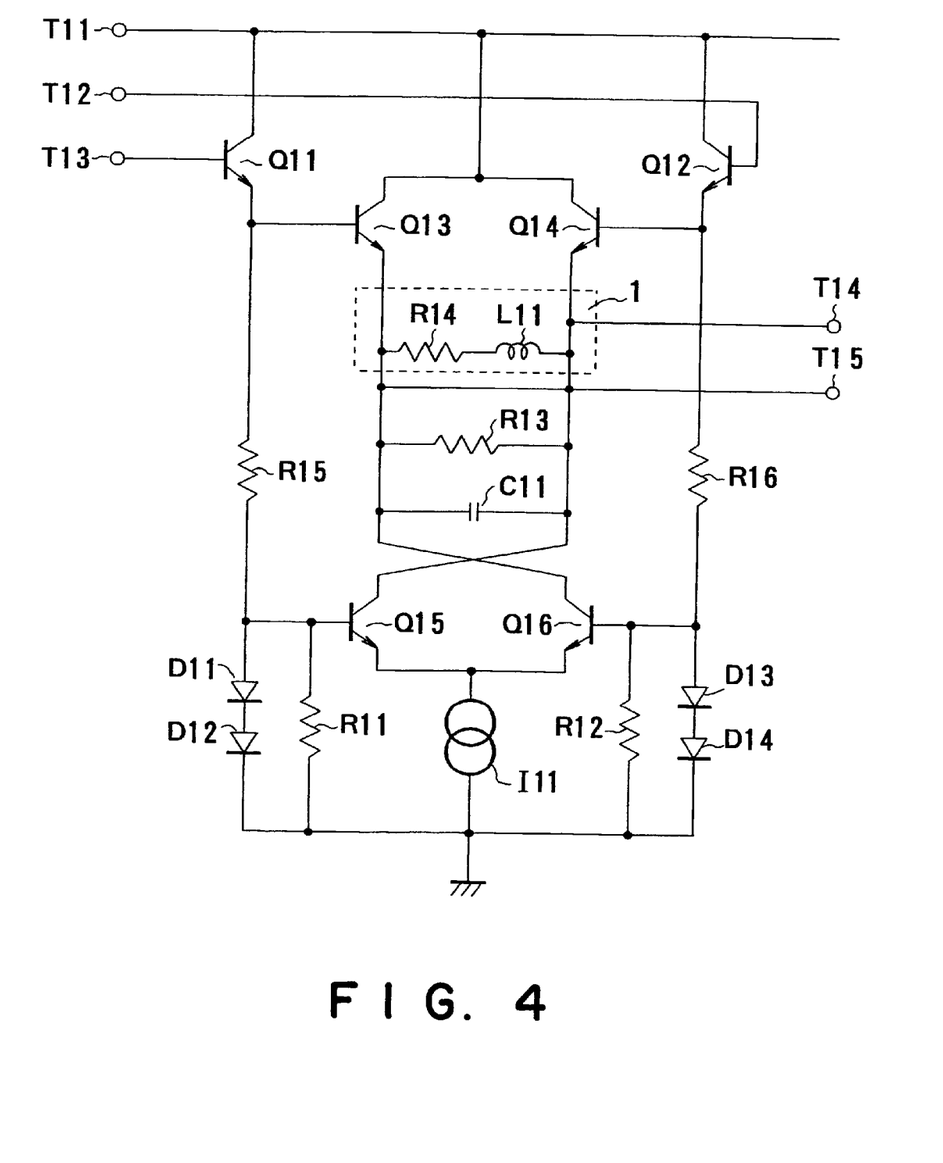
FIG. 4 is a circuit diagram showing an example of the circuit configuration of a recording means in the magnetic disk apparatus.

FIG. 4 shows an example of the circuit of the recording means 2. A predetermined DC voltage Vcc is input to a terminal T11. A terminal T13 externally receives a recording signal S11 shown in FIG. 2, and a terminal T12 receives a signal /S11 having a phase opposite to that of the recording signal S11.

The collector and emitter of an npn-type bipolar transistor Q11, a resistor R15, and diodes D11 and D12 are series-connected between the terminal T11 and a ground terminal, while the collector and emitter of an npn-type bipolar transistor Q12, a resistor R16, and diodes D13 and D14 are series-connected parallel thereto.

The collector and emitter of an npn-type bipolar transistor Q13, those of an npn-type bipolar transistor Q16, and a constant current source I11 are series-connected between the terminal T11 and the ground terminal, while the collector and emitter of an npn-type bipolar transistor Q14 and those of an npn-type bipolar transistor Q15 are series-connected parallel thereto between the terminal T11 and one terminal of the constant current source I11.

A resistor R14 and a coil L11 are connected between the emitters of the transistors Q13 and Q14, and correspond to the equivalent circuit of the magnetic head 1.

A capacitor C11 connected between the emitters of the transistors Q13 and Q14 exhibits a stray capacitance included in the magnetic head 1 or the circuit. A resistor R13 connected parallel to the capacitor C11 between the emitters of the transistors Q13 and Q14 corresponds to a damping resistor for shaping the waveform of the recording current flowing through the coil L11 of the magnetic head 1.

Resistors R11 and R12 are respectively connected between the bases of the transistors Q15 and Q16 and the ground terminal.

The counter electromotive force generated across the two terminals of the coil L11 included in the magnetic head 1 is extracted from terminals T14 and T15 respectively connected to the emitters of the transistors Q14 and Q13.

The signals S11 and /S11 having opposite phases are input to the terminals T12 and T13. When a high-level signal is input to the terminal T13, the transistors Q11, Q13, and Q15 are turned on, the transistors Q12, Q14, and Q16 are turned off, and the recording current is supplied to the magnetic head 1. This recording current has a current value set at the current source I11. A voltage having a desirable amplitude is applied to the base of the transistor Q15 through the resistors R15 and R11 and the diodes D11 and D12. Similarly, a voltage having a desirable amplitude is applied to the base of the transistor Q16 through the resistors R16 and R12 and the diodes D13 and D14.

To the contrary, if a low-level signal is input to the terminal T13, the transistors Q12, Q14, and Q16 are turned on, and the transistors Q11, Q13, and Q15 are turned off. As a result, the recording current flows through the magnetic head 1 in an opposite direction.

Figure 5:
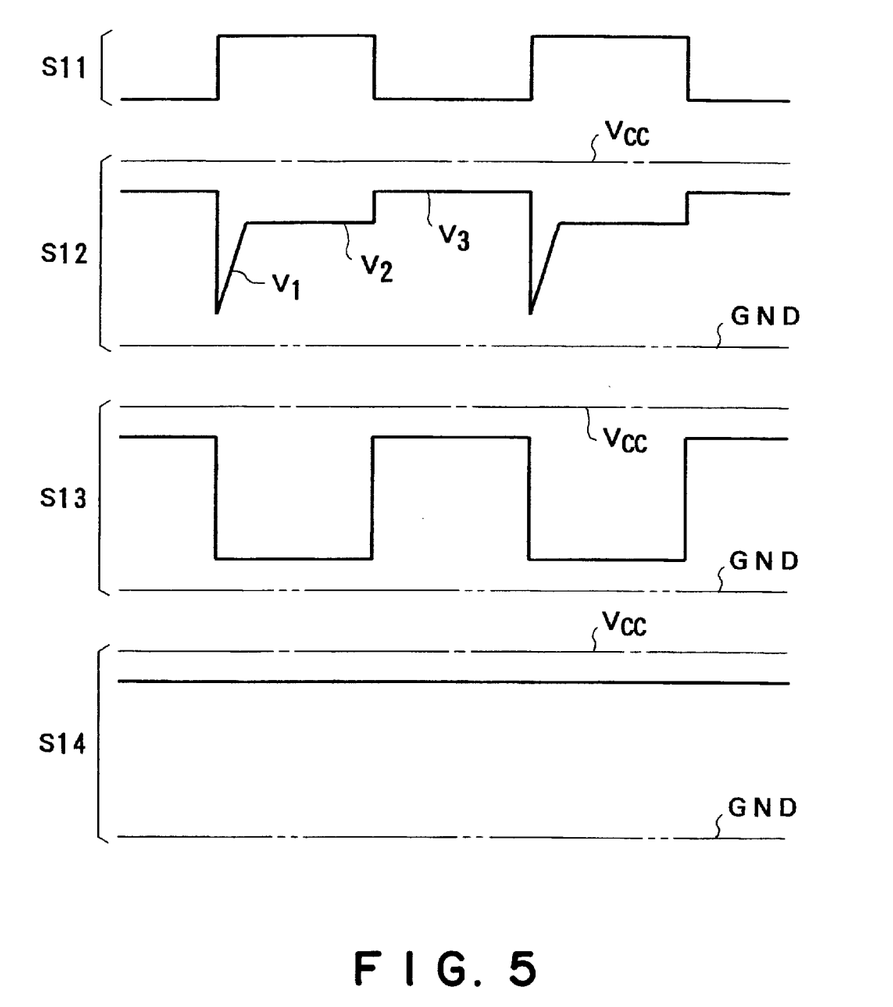
FIG. 5 is a timing chart showing respective voltage waveforms in the magnetic disk apparatus.

The above operation is repeatedly executed. When the magnetic head 1 is normal, a voltage waveform shown as a signal S12 in FIG. 5 is generated at the terminal T15 of the magnetic head 1. A voltage waveform having a phase shifted by 180° from the signal S12 is generated at the output terminal T14.

A pulse V1 generated on the negative side of the signal S12 is caused by a counter electromotive voltage generated by the signal line 11 included in the magnetic head 1. The level of a voltage V2 is determined by voltage drop which occurs across the two terminals of the resistor R14 included in the magnetic head 1. A voltage V3 corresponds to the emitter voltage of the transistor Q13.

If disconnection or a short circuit occurs in the magnetic head 1, voltage waveforms different from those in the normal state are generated at the terminals T14 and T15. If disconnection occurs in the magnetic head 1, the voltage waveform becomes a waveform shown as a signal S13 in FIG. 5. If the two terminals of the magnetic head 1 short-circuit, a waveform like a signal S4 is output.

Figure 6:
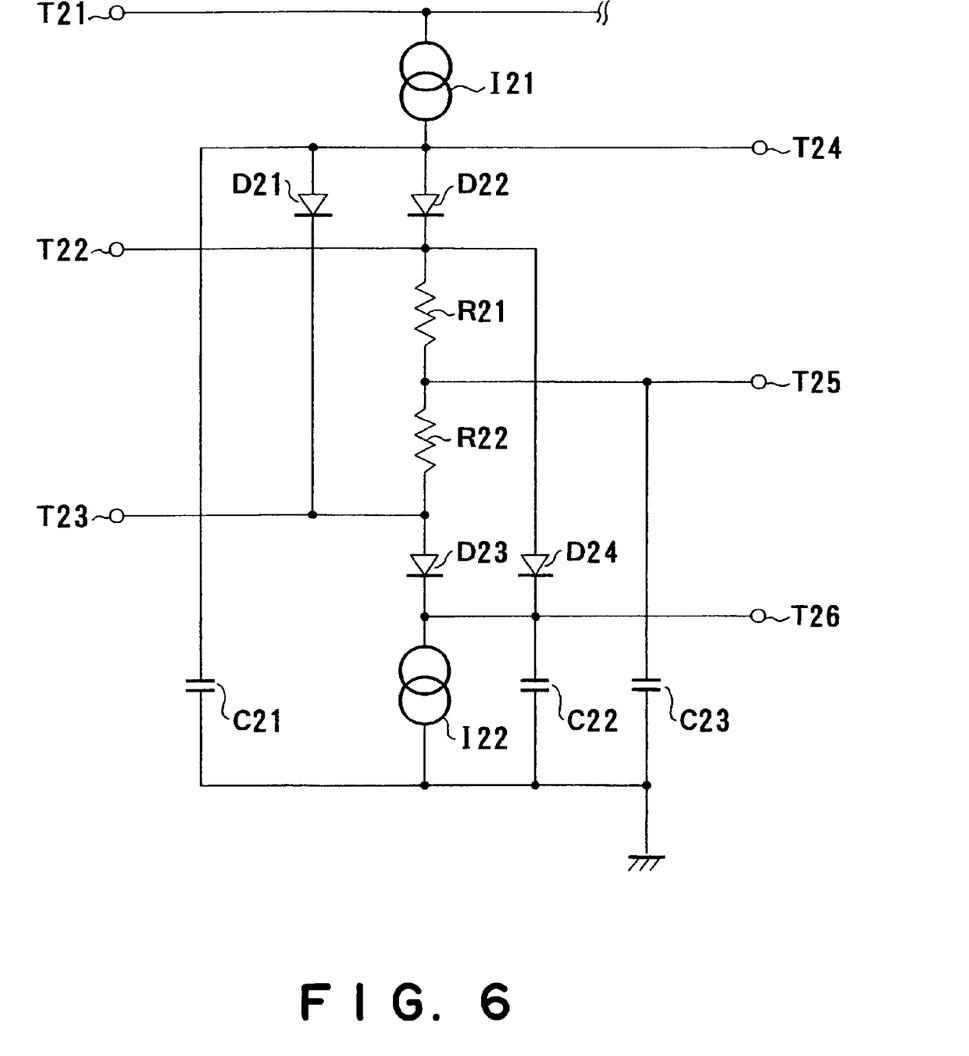
FIG. 6 is a circuit diagram showing an example of the circuit configuration of a voltage detection means in the magnetic disk apparatus.

FIG. 6 shows an example of the circuit of the voltage detection means 3 connected to the output side of the recording means 2 having the above arrangement. The power supply voltage Vcc is input to a terminal T21. A terminal T23 receives a signal S12 output from the recording means 2, and a terminal T22 receives a signal /S12 having a phase shifted by 180°.

Resistors R21 and R22 having the same resistance value are series-connected between the terminals T22 and T23, and their connection node is connected to an output terminal T25 for outputting a mean voltage. A constant current source I21 is connected between the terminal T21 and a terminal T24. A diode D22 is connected between the terminals T24 and T22, and a diode D23 is connected between the terminal T23 and a terminal T26. A constant current source I22 is connected between the terminal T26 and the ground terminal. A diode D21 is connected between the terminals T24 and T23, and a diode D24 is connected between the terminals T25 and T26. A capacitor C21 is connected between the terminal T24 and the ground terminal, a capacitor C22 is connected between the terminal T26 and the ground terminal, and a capacitor C23 is connected between the terminal T25 and the ground terminal. The capacitors C21 to C23 are arranged to remove unnecessary RF components because the minimum, mean, and maximum voltages must be output as DC components from the output terminals T24 to T26.

When the power supply voltage Vcc, an inverted signal /S12, and the signal S12 are respectively input to the terminals T21, T22, and T23, a mean voltage corresponding to the mean value of the minimum and maximum levels of the signal S12 or /S12 is output from the output terminal T25. The mean voltage can be output when either one of the signal S12 and the inverted signal /S12 is input. However, when noise is mixed, if the two signals are input as in this embodiment, the noise can be canceled to remove its influence. In addition, even if the level of the input signal S12 or /S12 varies, an almost constant mean value can be held because the capacitor C23 is connected between the connection node between the resistors R21 and R22 and the ground terminal, as described above.

The minimum voltage of the signal S12 or the inverted signal /S12 is output from the terminal T24. When the signal S12 and the inverted signal /S12 are respectively input to the terminals T22 and T23, the capacitor C21 holds the minimum potential. The constant current source I21 supplies a small current so as not to rapidly charge the capacitor C21.

The maximum voltage of the signal S12 or the inverted signal /S12 is output from the terminal T26. When the signal S12 and the inverted signal /S12 are respectively input to the terminals T22 and T23, the capacitor C22 holds the minimum potential. An output current from the constant current source I22 is set small so as not to rapidly discharge the capacitor C22.

Figure 8:
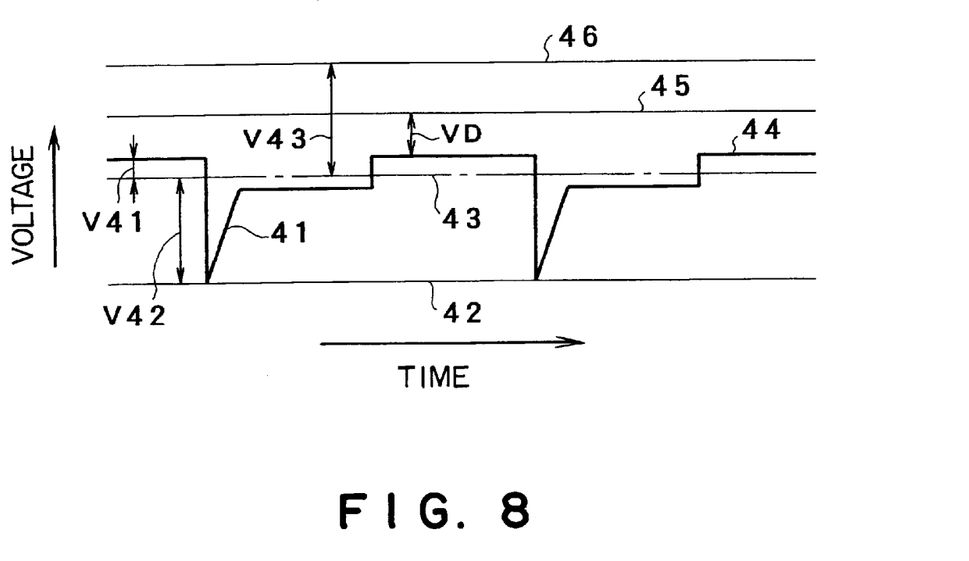
FIG. 8 is a timing chart showing the maximum, minimum, and mean voltages output from the processing means.

FIG. 8 shows a waveform 41 of the signal S12 in the normal state, and minimum, maximum, and mean voltages 42, 44, and 43 in the waveform 41. The waveform 41 is not vertically symmetrical to the mean voltage 43, and a potential difference V42 between the mean and minimum voltages 43 and 42 is larger than a potential difference V41 between the mean and maximum voltages 43 and 44.

To the contrary, if disconnection occurs at the end portion of the magnetic head 1, the waveform is vertically symmetrical to the mean level, like the signal S13 shown in FIG. 5. Similarly, if a short circuit occurs at the end portion of the magnetic head 1, the waveform is vertically symmetrical to the mean level, like the signal S14 shown in FIG. 5. Therefore, if an abnormality occurs in the magnetic head 1, the potential difference between the mean and minimum voltages is almost equal to that between the mean and maximum voltages.

For this reason, the minimum voltage 42 is folded back to the positive side by using the mean voltage 43 as a center to generate a voltage 46. The voltage 46 corresponds to the absolute value of the second voltage difference between the minimum and mean voltages. A voltage VD of a predetermined level is added to the maximum voltage 44 to obtain the total of the absolute value of the first voltage difference between the maximum and mean voltages, and the predetermined value. The voltage VD corresponds to a margin for noise and the like.

It is determined that the magnetic head 1 is normal when the voltage 46 is larger than the total of the maximum voltage 44 and the voltage VD, and that an abnormality occurs in the magnetic head 1 when the voltage 46 is smaller.

Figure 7:
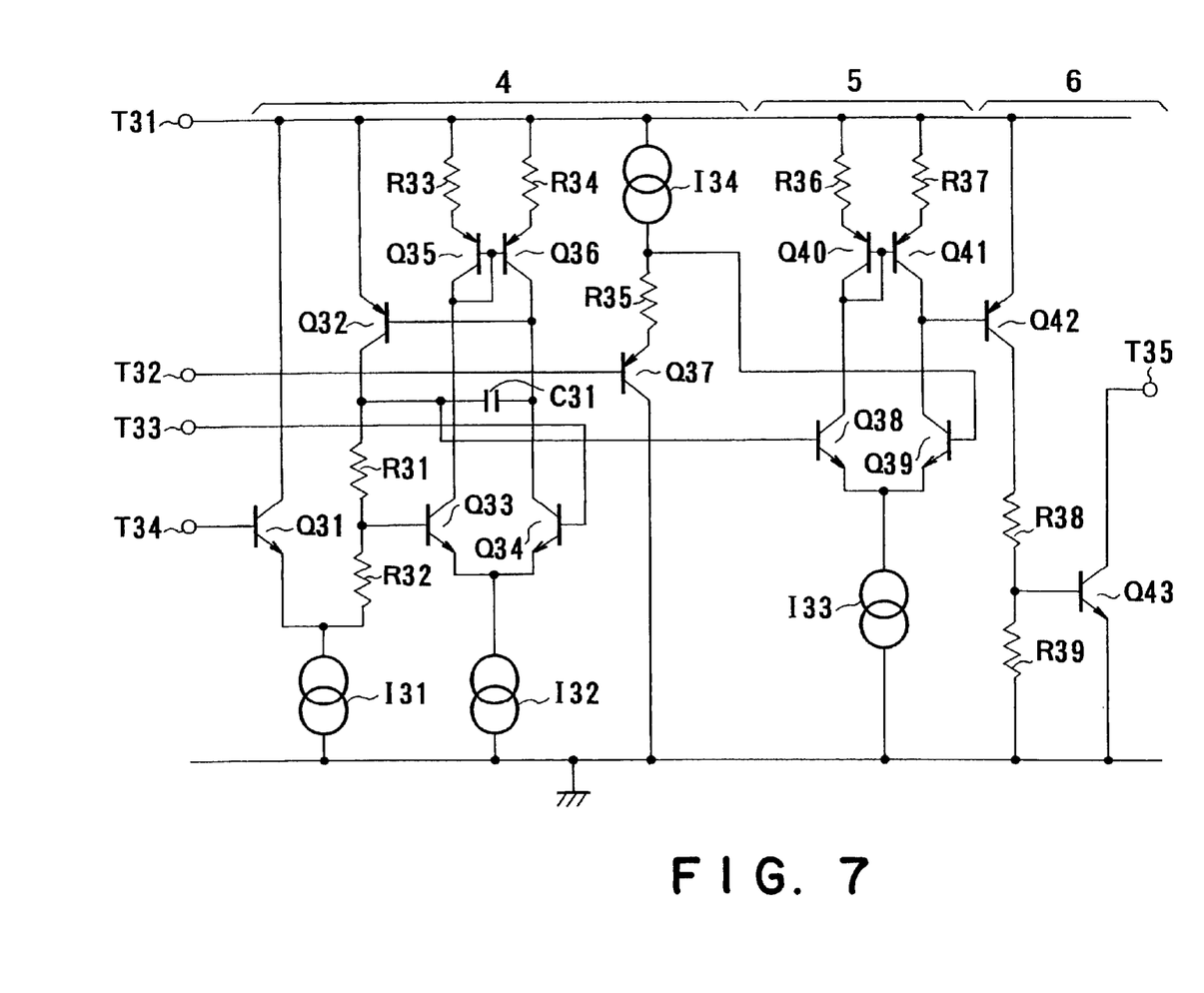
FIG. 7 is a circuit diagram showing an example of the circuit configuration of a processing means, a discrimination means, and an output means in the magnetic disk apparatus.

FIG. 7 shows an example of the detailed circuit configuration of the processing means 4, the discrimination means 5, and the output means 6 which realize this processing.

The arrangement of the processing means 4 will be first described. The collector and emitter of an npn-type bipolar transistor Q31 are connected between a terminal T31 for receiving the power supply voltage Vcc, and the other terminal of a constant current source I31 having one terminal grounded, while the emitter and collector of a pnp-type bipolar transistor Q32, and resistors R31 and R32 are series-connected parallel thereto. The base of the transistor Q31 is connected to an input terminal T34 for receiving the minimum voltage 42. The resistors R31 and R32 are set to have the same resistance value.

A resistor R33, the emitter and collector of a pnp-type bipolar transistor Q35, and those of an npn-type bipolar transistor Q33 are series-connected between the terminal T31 and the other terminal of a constant current source I32 having one terminal grounded, while a resistor R34, the emitter and collector of a pnp-type bipolar transistor Q36, and those of an npn-type bipolar transistor Q34 are series-connected parallel thereto. The bases of both the transistors Q35 and Q36 are connected to the collector of the transistor Q35, the base of the transistor Q33 is connected to the connection node between the resistors R31 and R32, and the base of the transistor Q34 is connected to a terminal T33 for receiving the mean voltage. A phase compensation capacitor C31 is connected between the collectors of the transistors Q32 and Q36 in order to prevent oscillation.

A constant current source I34, a resistor R35, and the emitter and collector of a pnp-type bipolar transistor Q37 are series-connected between the terminal T31 and the ground terminal. The base of the transistor Q37 is connected to a terminal T32 for receiving the maximum voltage.

As the discrimination means 5, a resistor R36, the emitter and collector of a pnp-type bipolar transistor Q40, and those of an npn-type bipolar transistor Q38 are series-connected between the terminal T31 and the other terminal of a constant current source I33 having one terminal grounded, while a resistor R37, the emitter and collector of a pnp-type bipolar transistor Q41, and those of an npn-type bipolar transistor Q39 are series-connected parallel thereto. The bases of both the transistors Q40 and Q41 are connected to the collector of the transistor Q40, the base of the transistor Q38 is connected to the collector of the transistor Q32, and the base of the transistor Q39 is connected to the connection node between the constant current source I34 and the resistor R35.

As the output means 6, the emitter and collector of a pnp-type bipolar transistor Q42, and resistors R38 and R39 are series-connected between the terminal T31 and the ground terminal. The base of the transistor Q42 is connected to the collector of the transistor Q41. The collector and emitter of an npn-type bipolar transistor Q43 are connected between an output terminal T35 and the ground terminal, and its base is connected to the connection node between the resistors R38 and R39.

The operations of the processing means 4, the discrimination means 5, and the output means 6 having the above circuit configuration will be explained. In the processing means 4, the resistors R31 to R34, the transistors Q32 to Q36, and the constant current sources I31 and I32 form a negative-feedback amplifier. The transistors Q33 and Q34 are controlled to have the same base voltage. Since the mean voltage 43 is input to the base of the transistor Q34 through the terminal T33, the base of the transistor Q33 is also controlled to generate a voltage equal to the mean voltage 43.

The minimum voltage 42 is input to the base of the transistor Q31 through the terminal T34, and a voltage substantially equal to this base voltage is generated at the connection node between the resistor R32 and the constant current source I31. As a result, the voltage 46 obtained by folding back the minimum voltage 42 to the positive side with respect to the mean voltage 43 in FIG. 6 is generated at the connection node between the collector of the transistor Q32 and the resistor R31. This voltage 46 is input to the base of the transistor Q38 of the discrimination means 5 (to be described later).

The maximum voltage 44 is input to the base of the transistor Q37 through the terminal T32. As a result, a voltage substantially equal to the maximum voltage 44 is generated at the emitter of the transistor Q37. A voltage 45 added with the voltage VD corresponding to voltage drop which occurs across the two terminals of the resistor R35 is generated at the connection node of the constant current source I34 and the resistor R35.

Eve In the discrimination means 5, the transistors Q38 to Q41, the resistors R36 and R37, and the constant current source I33 constitute a large-gain differential amplifier. The voltage 46 obtained by folding back the minimum voltage 42 to the positive side in the above manner is input to the base of the transistor Q38, while the voltage 45 as the total of the maximum voltage 44 and the predetermined voltage VD is input to the base of the transistor Q39.

When the magnetic head 1 is normal, the voltage 46 is larger than the voltage 45, as shown in FIG. 8. For this reason, the transistor Q38 is turned on, the transistor Q39 is turned off, and the collector voltage of the transistor Q41 rises.

This collector voltage is input to the base of the transistor Q42 of the output means 6 to turn off the transistor Q42, and also turn off the transistor Q43. As a result, the output terminal T35 is set in a high-impedance state.

If an abnormality occurs in the magnetic head 1, the voltage 46 becomes smaller than the voltage 45, the transistor Q38 is turned off, and the transistor Q39 is turned on. The collector voltage of the transistor Q41 falls to turn on the transistors Q42 and Q43. The output terminal T35 has a voltage almost equal to the ground voltage.

In this manner, according to this embodiment, the output terminal T35 has a high impedance when the magnetic head 1 is normal, and changes to low level when an abnormality occurs. Therefore, an abnormality which occurs in the recording magnetic head constituted by the two terminals in the highly sensitive MR head can be detected with a high precision.

The above-described embodiment is merely an example, and does not limit the present invention. For example, the circuit configurations shown in FIGS. 4, 6, and 7 are only an example, and can be variously modified as far as the same operation as the operations of the voltage detection means, the processing means, the discrimination means, and the output means can be attained.

Figure 10:
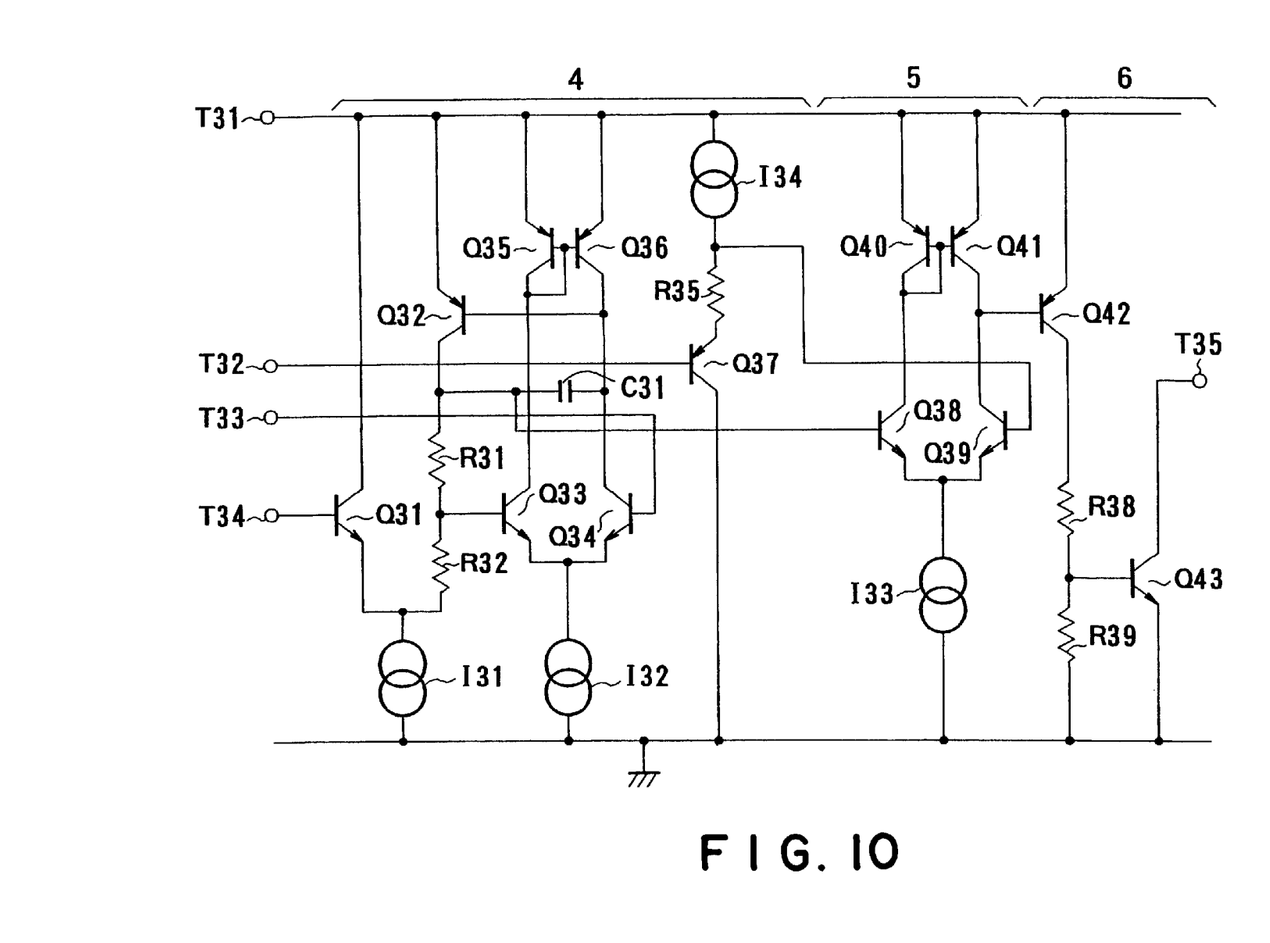
FIG. 10 is a circuit diagram showing a modification of the circuit shown in FIG. 7.

For example, the resistors R33, R34, R36, and R37 in FIG. 7 may be omitted, and the emitters of the transistors Q35, Q36, Q40, and Q41 may be directly connected to the terminal T31, as shown in FIG. 10. In this case, the characteristics of the transistors Q35 and Q36 must be almost the same, while those of the transistors Q40 and Q41 must be almost the same. If the characteristics of the transistors are not so identical, the above resistors R33, R34, R36, and R37 are desirably arranged.

What is claimed is:

1. A method of detecting an abnormality in a recording head, comprising the steps of:

supplying said recording head with a recording current;

detecting a maximum voltage, a minimum voltage, and a mean voltage of a counter electromotive voltage generated across two terminals of said recording head;

calculating a total of a predetermined value and an absolute value of a first voltage difference between the mean voltage and the maximum voltage;

calculating an absolute value of a second voltage difference between the mean voltage and the minimum voltage;

comparing the calculated total of the absolute value of the first voltage difference and the predetermined value with the calculated absolute value of the second voltage difference; and determining whether an abnormality occurs in said recording head based on said comparing step.

2. A method according to claim 1, wherein the step of determining whether the abnormality occurs in said recording head comprises determining that the abnormality occurs in said recording head when the absolute value of the second voltage difference is smaller than the total of the absolute value of the first voltage difference and the predetermined value.

3. A circuit for detecting an abnormality in a recording head, comprising:

recording means, connected to a terminal of said recording head, for supplying a recording current to said recording head;

voltage detection means, connected to said terminal of said recording head, for receiving the recording current from said recording means, and detecting a maximum voltage, a minimum voltage, and a mean voltage of a counter electromotive voltage generated across two terminals of said recording head;

processing means for receiving the maximum, minimum, and mean voltages detected by said voltage detection means, and calculating a total of a predetermined value and an absolute value of a first voltage difference between the mean voltage and the maximum voltage, and calculating an absolute value of a second voltage difference between the mean voltage and the minimum voltage; and discrimination means for receiving and comparing the total of the absolute value of the first voltage difference and the predetermined value, with the absolute value of the second voltage difference and determining whether an abnormality occurs in said recording head based on said comparing.

4. A circuit according to claim 3, wherein said discrimination means determines that the abnormality occurs in said recording head when the absolute value of the second voltage difference is smaller than the total of the absolute value of the first voltage difference and the predetermined value.

5. A circuit according to claim 3, wherein said voltage detection means comprises:

a first current source connected between a power supply voltage terminal and a first output terminal;

a first diode element having an anode connected to said first output terminal, and a cathode connected to a first input terminal;

a first resistor element having two terminals connected between said first input terminal and a second output terminal;

a second resistor element having two terminals connected between said second output terminal and a second input terminal;

a second diode element having an anode connected to said second input terminal, and a cathode connected to a third output terminal;

a second current source having two terminals connected between said third output terminal and a ground terminal;

a third diode element having an anode connected to said first output terminal, and a cathode connected to said second input terminal;

a first capacitor having two terminals connected between said first output terminal and said ground terminal;

a fourth diode element having an anode connected to said first input terminal, and a cathode connected to said third output terminal;

a second capacitor having two terminals connected between said third output terminal and said ground terminal; and a third capacitor having two terminals connected between said second output terminal and said ground terminal, and when said first input terminal receives a counter electromotive voltage generated across said two terminals of said magnetic head to which the recording current is supplied, and said second input terminal receives an inverted counter electromotive voltage having a phase shifted by 180° from that of the counter electromotive voltage, the minimum voltage is output from said first output terminal, the mean voltage is output from said second output terminal, and the maximum voltage is output from said third output terminal.

6. A circuit according to claim 3, wherein said processing means comprises:

a first transistor having a collector connected to a power supply voltage terminal, a base connected to a first input terminal, and an emitter connected to the other terminal of a first current source with one terminal grounded;

a second transistor having an emitter connected to said power supply voltage terminal, a base connected to a first node, and a collector connected to a second node;

first and second resistor elements series-connected between the second node and the other terminal of said first current source;

a third transistor having an emitter connected to said power supply voltage terminal directly or through a third resistor element, and a base connected to a collector thereof;

a fourth transistor having an emitter connected to said power supply voltage terminal directly or through a fourth resistor element, a base connected to said base of said third transistor, and a collector connected to the first node;

a capacitor having two terminals connected between the first and second nodes;

a fifth transistor having a collector connected to said collector of said third transistor, a base connected to a connection node between said first and second resistor elements, and an emitter connected to the other terminal of a second current source with one terminal grounded;

a sixth transistor having a collector connected to the first node, a base connected to a second input terminal, and an emitter connected to the other terminal of said second current source; and a seventh transistor having an emitter connected directly or through a fifth resistor element to the other terminal of a third current source with one terminal grounded, a base connected to a third input terminal, and a grounded collector, and when the minimum voltage is input to said first input terminal, the mean voltage is input to said second input terminal, and the maximum voltage is input to said third input terminal, the absolute value of the second voltage difference is output from the second node, and the absolute value of the first voltage difference is output from a connection node between the other terminal of said third current source and said collector of said seventh transistor, or the total of the absolute value of the first voltage difference and the predetermined value is output from a connection node between the other terminal of said third current source and said fifth resistor element.

7. A circuit according to claim 3, wherein said discrimination means comprises:

a first transistor having an emitter connected to a power supply voltage terminal directly or through a first resistor element, and a base connected to a collector thereof;

a second transistor having an emitter connected to said power supply voltage terminal directly or through a second resistor element, and a base connected to said base of said first transistor;

a third transistor having a collector connected to said collector of said first transistor, said collector being connected to the other terminal of a first current source with one terminal grounded; and a fourth transistor having a collector connected to said collector of said second transistor, said collector being connected to the other terminal of said first current source with one terminal grounded, and when the absolute value of the second voltage difference is input to a base of said third transistor, and either of the absolute value of the first voltage difference or the total of the absolute value of the first voltage difference and the predetermined value is input to a base of said fourth transistor, a signal representing presence/absence of an abnormality in said magnetic head is output from said collector of said second transistor.

8. A magnetic disk apparatus comprising:
- a recording head for performing recording on a magnetic disk;
- recording means, connected to a terminal of said recording head, for supplying a recording current to said recording head;
- voltage detection means, connected to said terminal of said recording head, for receiving the recording current from said recording means, and detecting a maximum voltage, a minimum voltage, and a mean voltage of a counter electromotive voltage generated across two terminals of said recording head;
- processing means for receiving the maximum, minimum, and mean voltages detected by said voltage detection means, and calculating a total of a predetermined value and an absolute value of a first voltage difference between the mean voltage and the maximum voltage, and calculating an absolute value of a second voltage difference between the mean voltage and the minimum voltage; and
- discrimination means for receiving and comparing the total of the absolute value of the first voltage difference and the predetermined value, with the absolute value of the second voltage difference and determining whether an abnormality occurs in said recording head based on said comparing.

9. A circuit for detecting an abnormality in a recording head having a pair of terminals, comprising:
- a recording circuit having output terminals connected to the terminals of said recording head and configured to supply a recording current to said recording head;
- a voltage detection circuit having input terminals connected to the terminals of said recording head, and configured to receive a counter electromotive voltage generated across the terminals of said recording head, and to detect a maximum voltage, a minimum voltage, and a mean voltage of the generated counter electromotive voltage, and having output terminals which output the maximum, minimum and mean voltages, respectively;
- a processing circuit having input terminals which receive respective of the maximum, minimum and mean voltages output by said voltage detection circuit, said processing circuit configured to calculate a total of a predetermined value and an absolute value of a first voltage difference between the mean voltage and the maximum voltage, and to calculate an absolute value of a second voltage difference between the mean voltage and the minimum voltage, and having output terminals which output the total of the absolute value of the first voltage difference and a predetermined value, and the absolute value of the second voltage, respectively; and
- a discrimination circuit having a differential amplifier including input terminals configured to receive and compare the total of the absolute value of the first voltage difference and the predetermined value, with the absolute value of the second voltage difference, and having an output terminal which outputs a signal indicating a determination of whether an abnormality occurs in said recording head based on a comparison performed by said discrimination circuit.

10. A circuit according to claim 9, wherein said discrimination circuit is configured to determine that the abnormality occurs in said recording head when the absolute value of the second voltage difference is smaller than the total of the absolute value of the first voltage difference and the predetermined value.

11. A method of detecting an abnormality in a recording head, comprising the steps of:
- supplying said recording head with a recording current;
- detecting a maximum voltage, a minimum voltage, and a mean voltage of a counter electromotive voltage generated across two terminals of said recording head;
- calculating an absolute value of a first voltage difference between the mean voltage and the maximum voltage;
- calculating an absolute value of a second voltage difference between the mean voltage and the minimum voltage; and
- comparing the calculated absolute value of a first voltage difference with the calculated absolute value of the second voltage difference; and
- determining whether an abnormality occurs in said recording head based on said comparing step.

12. A circuit for detecting an abnormality in a recording head, comprising:
- recording means, connected to a terminal of said recording head, for supplying a recording current to said recording head;
- voltage detection means, connected to said terminal of said magnetic head, for receiving the recording current from said recording means, and detecting a maximum voltage, a minimum voltage, and a mean voltage of a counter electromotive voltage generated across two terminals of said recording head;
- processing means for receiving the maximum, minimum, and mean voltages detected by said voltage detection means, and calculating an absolute value of a first voltage difference between the mean voltage and the maximum voltage, and calculating an absolute value of a second voltage difference between the mean voltage and the minimum voltage; and
- discrimination means for receiving and comparing the absolute value of the first voltage difference with the absolute value of the second voltage difference and determining whether an abnormality occurs in said recording head based on said comparing.

13. A magnetic disk apparatus comprising:
- a recording head for performing recording on a magnetic disk;
- recording means, connected to a terminal of said recording head, for supplying a recording current to said recording head;
- voltage detection means, connected to said terminal of said recording head, for receiving the recording current from said recording means, and detecting a maximum voltage, a minimum voltage, and a mean voltage of a counter electromotive voltage generated across two terminals of said recording head;
- processing means for receiving the maximum, minimum, and mean voltages detected by said voltage detection means, and calculating an absolute value of a first voltage difference between the mean voltage and the maximum voltage and calculating an absolute value of a second voltage difference between the mean voltage and the minimum voltage; and
- discrimination means for receiving and comparing the absolute value of the first voltage difference with the absolute value of the second voltage difference and determining whether an abnormality occurs in said recording head based on said comparing.

14. A circuit for detecting an abnormality in a recoding head having a pair of terminals, comprising:

a recording circuit having output terminals connected to the terminals of said recording head and configured to supply a recording current to said recording head;

a voltage detection circuit having input terminals connected to the terminals of said recording head, and configured to receive a counter electromotive voltage generated across the terminals of said recording head, and to detect a maximum voltage, a minimum voltage, and a mean voltage of the generated counter electromotive voltage, and having output terminals which output the maximum, minimum and mean voltages, respectively;

a processing circuit having input terminals which receive respective of the maximum, minimum and mean voltages output by said voltage detection circuit, said processing circuit configured to calculate an absolute value of a first voltage difference between the mean voltage and the maximum voltage and to calculate an absolute value of a second voltage difference between the mean voltage and the minimum voltage, and having output terminals which output the absolute value of the first voltage and the absolute value of the second voltage, respectively; and a discrimination circuit having a differential amplifier including input terminals configured to receive and compare the absolute value of the first voltage difference with the absolute value of the second voltage difference, and having an output terminal which outputs a signal indicating a determination of whether an abnormality occurs in said recording head based on a comparison by said discrimination circuit.

* * * * *